United States Patent
Wood et al.

(10) Patent No.: US 9,611,029 B2
(45) Date of Patent: Apr. 4, 2017

(54) FLOOR BEAM SUPPORT ASSEMBLY, SYSTEM, AND ASSOCIATED METHOD

(75) Inventors: Jeffrey H. Wood, Eureka, MO (US); Charles R. Saff, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 2070 days.

(21) Appl. No.: 11/548,526

(22) Filed: Oct. 11, 2006

(65) Prior Publication Data

US 2010/0126101 A1    May 27, 2010

(51) Int. Cl.
*B64C 1/18* (2006.01)
*E04C 3/04* (2006.01)

(52) U.S. Cl.
CPC ........ *B64C 1/18* (2013.01); *E04C 2003/0452* (2013.01)

(58) Field of Classification Search
CPC .................. E04C 2003/0452; B64C 1/18
USPC ....... 52/653, 261, 262, 263, 302.1; 244/119, 244/131, 133, 120, 125, 126, 132; 29/897.2
See application file for complete search history.

(56) References Cited

U.S. PATENT DOCUMENTS

| | | | |
|---|---|---|---|
| 1,963,416 A * | 6/1934 | Minshall | 244/131 |
| 4,479,621 A * | 10/1984 | Bergholz | B64C 1/18 244/117 R |
| 4,989,809 A * | 2/1991 | Arnold | 244/137.1 |
| 5,171,510 A * | 12/1992 | Barquet et al. | 264/258 |
| 5,779,193 A * | 7/1998 | Sloan | 244/117 R |
| 5,806,797 A * | 9/1998 | Micale | 244/120 |
| 6,219,973 B1 * | 4/2001 | Lafferty | 52/23 |
| 6,264,141 B1 * | 7/2001 | Shim | B64C 1/18 244/118.5 |
| 6,554,225 B1 * | 4/2003 | Anast et al. | 244/117 R |
| 6,955,021 B2 * | 10/2005 | Thomas | 52/650.3 |
| 7,241,185 B1 * | 7/2007 | Cecil et al. | 439/730 |
| 7,338,013 B2 * | 3/2008 | Vetillard | B64C 1/18 244/117 R |

(Continued)

FOREIGN PATENT DOCUMENTS

WO    WO2005/012083 A1 *  2/2005    ............ B64C 1/20

OTHER PUBLICATIONS

Boeing 777 Program Background [online] [retrieved Feb. 20, 2009]. Retrieved from the Internet: <URL: http://web.archive.org/web/20040406040331/http://www.boeing.com/commercial/777family/pf/pr_backgr . . . >. (dated at least as early as Apr. 6, 2004) 5 pages.

(Continued)

*Primary Examiner* — Joshua J Michener
*Assistant Examiner* — Theodore Adamos
(74) *Attorney, Agent, or Firm* — Alston & Bird LLP (57) ABSTRACT

A floor beam assembly, system, and method for supporting floor beams within a structure are provided. According to one embodiment, a floor beam assembly for installing a floor beam within a structure is provided. The assembly includes at least one floor beam, wherein at least a portion of each floor beam comprises a composite material. The assembly also includes at least one support bracket attached to a structure, wherein each support bracket is configured to support at least a portion of a floor beam thereon. In addition, the assembly includes at least one conductive element extending from the at least one support bracket and configured for electrically communicating with the at least one support bracket.

21 Claims, 6 Drawing Sheets

(56) References Cited

U.S. PATENT DOCUMENTS

| | | | |
|---|---|---|---|
| 2004/0003569 A1* | 1/2004 | Frederickson | 52/737.3 |
| 2004/0011927 A1* | 1/2004 | Christman et al. | 244/131 |
| 2006/0006284 A1* | 1/2006 | Vetillard | B64C 1/18 |
| | | | 244/119 |
| 2006/0226288 A1* | 10/2006 | Vetillard et al. | 244/119 |
| 2006/0231681 A1* | 10/2006 | Huber et al. | 244/119 |
| 2007/0149065 A1* | 6/2007 | Cecil | H01R 4/646 |
| | | | 439/730 |
| 2007/0176048 A1* | 8/2007 | Huber | B64C 1/061 |
| | | | 244/119 |
| 2007/0194175 A1* | 8/2007 | Kismarton et al. | 244/120 |
| 2008/0078129 A1* | 4/2008 | Wood et al. | 52/127.1 |
| 2008/0093503 A1* | 4/2008 | Cacciaguerra | 244/119 |
| 2008/0098682 A1 | 5/2008 | Wood | |
| 2010/0126101 A1* | 5/2010 | Wood | B64C 1/18 |
| | | | 52/650.3 |

OTHER PUBLICATIONS

*First Boeing 777-300 Extended Range Jetliner Delivers to Air France, ILFC,* News Release (dated Apr. 29, 2004) 2 pages.

\* cited by examiner

FLOOR BEAM SUPPORT ASSEMBLY, SYSTEM, AND ASSOCIATED METHOD

BACKGROUND OF THE INVENTION

1) Field of the Invention

Embodiments of the present invention relate to floor beam supports and, more particularly, to apparatus, systems, and methods for supporting floor beams and providing a current return network and grounding within a structure.

2) Description of Related Art

The floor of an aircraft is typically built up from a series of spaced apart transverse floor beams that span across oval hoop frames to form the structural framework for the aircraft fuselage. The floor beams are usually aluminum and are individually attached with fasteners at each end to the hoop frames via a lap joint. The joint formed between the floor beam and the hoop frame bears the transverse and shear loads applied to the floor beam. Loads applied in the fore and aft direction are bore by longitudinal shear trusses between the floor and the fuselage wall.

Current techniques for joining the floor beams and hoop frames require precise installation of mate-drilled holes between the floor beams and the hoop frames to ensure proper hole alignment for the fasteners. Once the floor beams are installed, the individual components comprising the floor assembly (e.g., seat tracks, floor panels, etc.) are subsequently attached to the floor beams. Future aircraft are moving away from aluminum to lightweight materials, such as composite materials. The use of composite material creates unique design, integration, and assembly issues that would normally not be problematic with respect to metallic materials.

In particular, composite materials present issues with respect to current return networks and grounding. Aircraft require means for conducting electricity both for current load and current return. Current loads are transferred through insulated electrical cables and wiring, wherein current returns and grounding are typically transferred through the aircraft metallic structure which provides low resistance conductive current paths for electrical grounding connections. However, composite materials typically have poor electrical conductivity and, therefore, require the installation of secondary metallic structures for current grounding and return network.

It would therefore be advantageous to provide an assembly, a system, and a method for supporting floor beams within a structure. In addition, it would be advantageous to provide an improved assembly, a system, and a method for supporting floor beams within a structure that provide adequate grounding and current return networks. Moreover, it would be further advantageous to provide an assembly, a system, and a method for more effectively supporting floor beams within a structure using composite materials.

BRIEF SUMMARY OF THE INVENTION

Embodiments of the invention may address at least some of the above needs and achieve other advantages by providing an assembly, a system, and a method for supporting floor beams and providing a current return network and grounding within a structure. Generally, embodiments of the present invention include floor beams supported by brackets secured to a structure, such as an aircraft structure. In addition, conductive elements are employed that facilitate electrical communication with the support brackets, such that current return networks and grounding may be maintained despite the presence of one or more composite materials that comprise the floor beam and/or structure. Fasteners need not necessarily be used to support the floor beams, which may reduce the incidence of misalignment and the installation time.

In one embodiment of the present invention, a floor beam assembly is provided. The assembly includes at least one floor beam, wherein at least a portion of each floor beam comprises a composite material. The assembly also includes at least one support bracket attached to a structure, wherein each support bracket is configured to support at least a portion of a floor beam thereon. In addition, the assembly includes at least one conductive element extending from the at least one support bracket and configured for electrically communicating with the at least one support bracket.

According to aspects of the assembly, each conductive element is integrally formed with the at least one support bracket, or each conductive element could be a cable buss bar interconnected with the at least one support bracket. Each support bracket and conductive element may be an electrically conductive material. Moreover, each of the support brackets may be a shelf configuration, and each floor beam may be supported by at least one of the support brackets without being attached to the support bracket.

An additional aspect of the present invention includes a floor beam system. The system includes a structure (e.g., aircraft structure) comprising a plurality of support members (e.g., hoop frames) and at least one floor beam positioned proximate to at least one of the support members. At least a portion of the structure and/or floor beam comprises a composite material. In addition, the system includes at least one support bracket attached to at least one of the support members, wherein each support bracket is configured to support at least a portion of the floor beam thereon. The system also includes at least one conductive element extending from the at least one support bracket and configured for electrically communicating with the at least one support bracket.

Variations of the system further include a floor panel positioned adjacent to a plurality of the floor beams. A pair of support brackets may be attached to each structural member, and each floor beam may be supported by a respective pair of support brackets. According to one embodiment, the at least one floor beam is a composite material.

A further aspect of the present invention provides a method for installing a floor beam assembly within a structure. The method includes providing at least one conductive element extending between at least one support bracket and configured for electrically communicating with the at least one support bracket. The method also includes attaching the at least one support bracket to a structure and positioning at least one composite floor beam on the at least one support bracket attached to the structure.

According to one aspect of the method, the providing step includes providing at least one conductive element that is integrally formed with the at least one support bracket. The providing step could alternatively include providing at least one conductive element comprising a cable buss bar. The method could further include attaching the cable buss bar to at the at least one support bracket. The positioning step may include positioning the at least one floor beam on the at least one support bracket without being attached to the at least one support bracket. Furthermore, the attaching step may include attaching a pair of support brackets to each structural member, while the positioning step may include positioning the at least one floor beam between a respective pair of support brackets.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
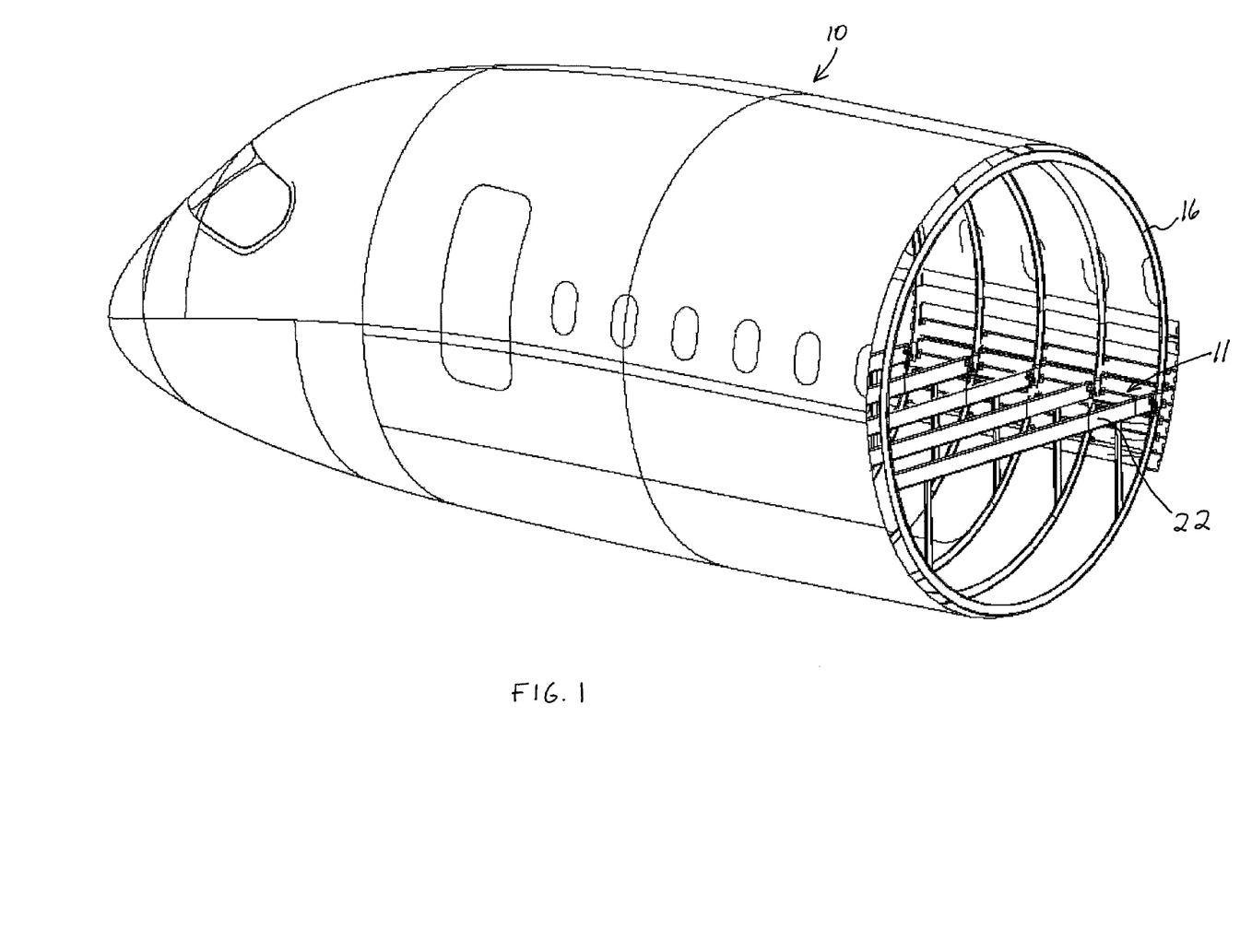
FIGS. 1 and 2 are perspective views of a structural system according to one embodiment of the present invention.

Referring now to the drawings and, in particular to FIG. 1, there is shown a system 10 for supporting a floor beam assembly 11 and providing grounding and current return networks within an aircraft structure according to one embodiment of the present invention. In particular, the floor beam assembly includes a plurality of support brackets 12 and conductive elements 14 that extend in a fore-aft direction along the structure. The conductive elements 14 provide a conductive current path for grounding and current return networks, as will be explained in further detail below. Although the system 10 is discussed in conjunction with an aircraft structure, it is understood that the system may be used in a variety of industries. Thus, the floor beam assembly could be utilized in a variety of industries where a floor beam assembly may be installed to a structure, such as in the aircraft, automotive, marine, or construction industries.

Figure 2:
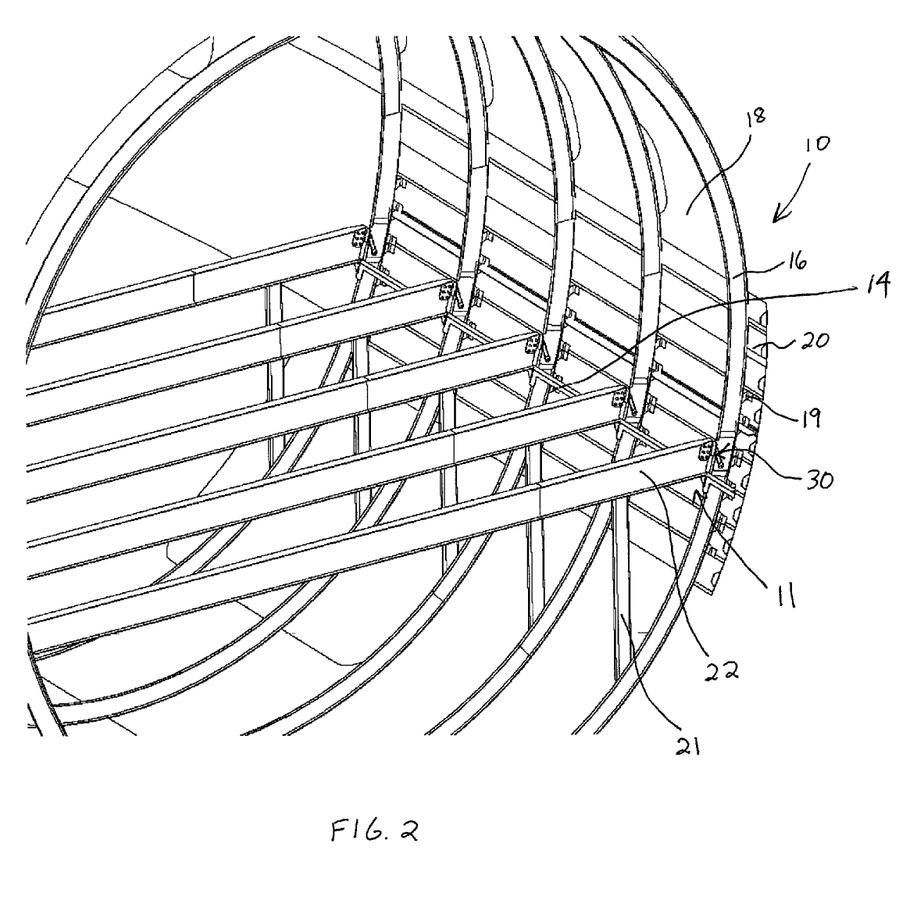

The system 10 may include a variety of components that comprise a structure. In general, an aircraft structure may include a plurality of structural supports, such as the hoop frames 16 illustrated in FIGS. 1 and 2. The hoop frames 16, as known to those of ordinary skill in the art, are formed in a circular or other looped configuration to define the framework of the aircraft fuselage. The hoop frames 16 may be various cross sections, such as a C-shaped cross section. The hoop frames 16 are typically a metallic material, such as aluminum, but could be a composite or combination of metallic and composite materials. Attached to the exterior of the hoop frames 16 is aircraft skin 18. The skin 18 may be attached to the hoop frames 16 using shear ties 19, as known to those of ordinary skill in the art. The skin 18 may be various materials, such as a composite (e.g., composite tape plies) and/or metallic material. The skin 18, as also known to those of ordinary skill in the art, may include stringers 20 (see FIG. 2) for adding structural support to the skin. The stringers 20 may be various configurations, such as hat-shaped as shown in FIG. 2, and secured to the aircraft skin using techniques known to those of ordinary skill in the art. Moreover, vertical stanchions 21 may be employed for adding structural support from shear loading on the floor beams 22.

In addition, the system 10 may include a plurality of floor beams 22 that are each supported at free ends by a support bracket 12, as illustrated in FIG. 2. Each floor beam 22 extends transversely to a longitudinal axis (i.e., a fore-aft direction) of the aircraft structure. In particular, each floor beam 22 is paired with a respective hoop frame 16. The floor beams 22 are capable of supporting a floor panel (not shown) thereon and are typically a composite material, although the floor beams could be a metallic material or combination thereof if desired. The floor panel is typically positioned adjacent to a plurality of floor beams 22. The floor beams 22 and the floor panel may be preassembled, and then the floor beams positioned adjacent, and in a weight-bearing relationship, to a supporting surface 32 of the support bracket 12. Thereafter, the floor beams 22 may be secured to the hoop frames 16 using various techniques, such as the pivot arms 30 illustrated in FIGS. 2, 4, and 5. For a more detailed discussion of installing a floor beam assembly within a structure using pivot arms 30, Applicants hereby incorporate by reference U.S. patent application Ser. No. 11/537,145, entitled Floor Beam Assembly, System, and Associated Method, which was filed on Sep. 29, 2006.

Figure 3:
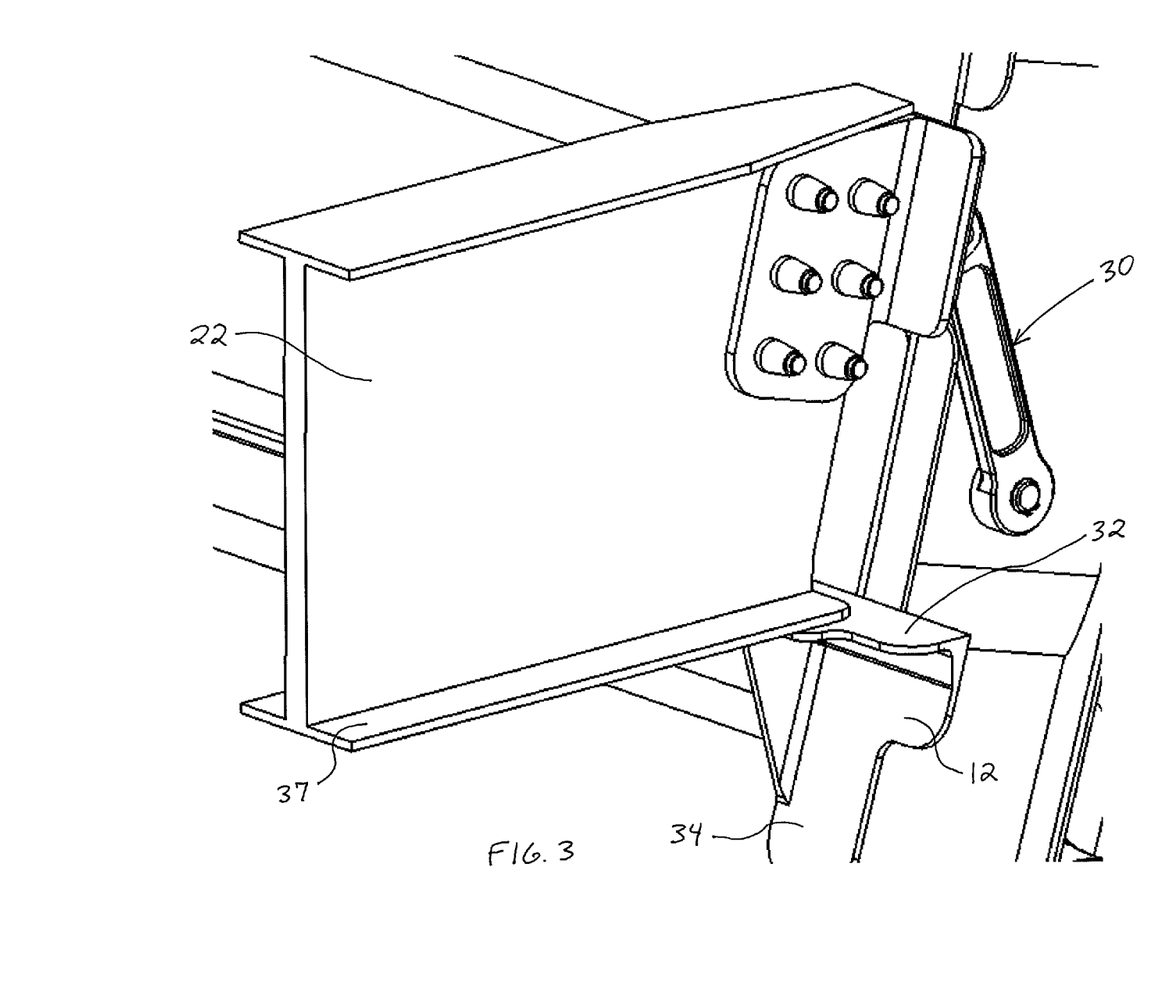
FIG. 3 is an enlarged perspective view of a floor beam supported by a support bracket according to one embodiment of the present invention.

A support bracket 12 may be attached to each hoop frame 16 for supporting each end of a respective floor beam 22. Each support bracket 12 is generally a shelf-like configuration that includes a support surface 32 and an attachment surface 34 extending generally perpendicular therefrom, as shown in FIG. 3. A lower edge 37 of the floor beam 22 is supported on the support surface 32. In particular, each floor beam 22 is positioned adjacent to the support surface 32, generally without using any attachment mechanism, such as fasteners. The attachment surface 34 is positioned adjacent to a respective hoop frame 16 and could be attached thereto using various techniques, such as fasteners. The support bracket 12 is advantageously formed of an electrically conductive material and is typically a metallic material, such as aluminum or titanium. The configuration of the support bracket 12 may vary, as long as the attachment surface 34 facilitates attachment to the hoop frame 16, and the support surface 32 facilitates supporting of the floor beam 22.

Figure 4:
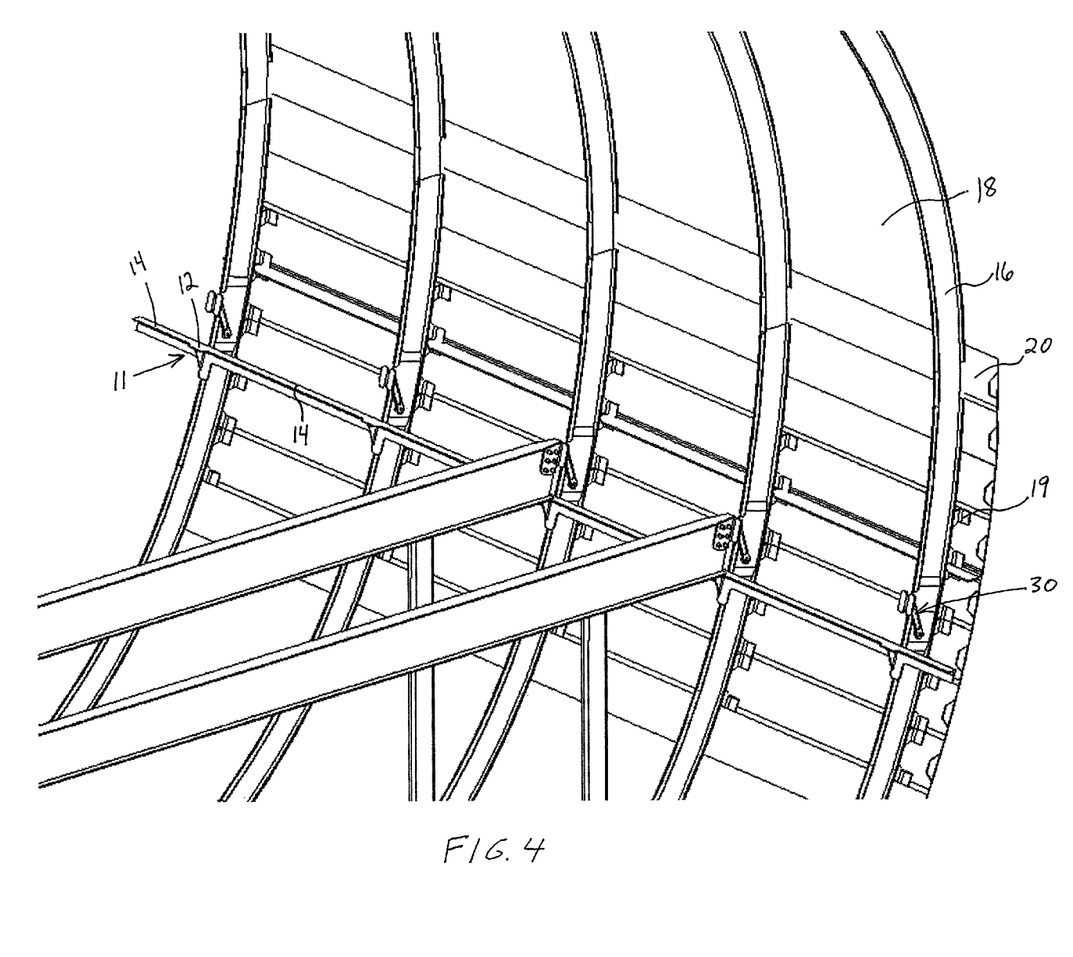
FIGS. 4 and 5 are enlarged perspective views of a floor beam assembly according to an embodiment of the present invention.
Figure 5:
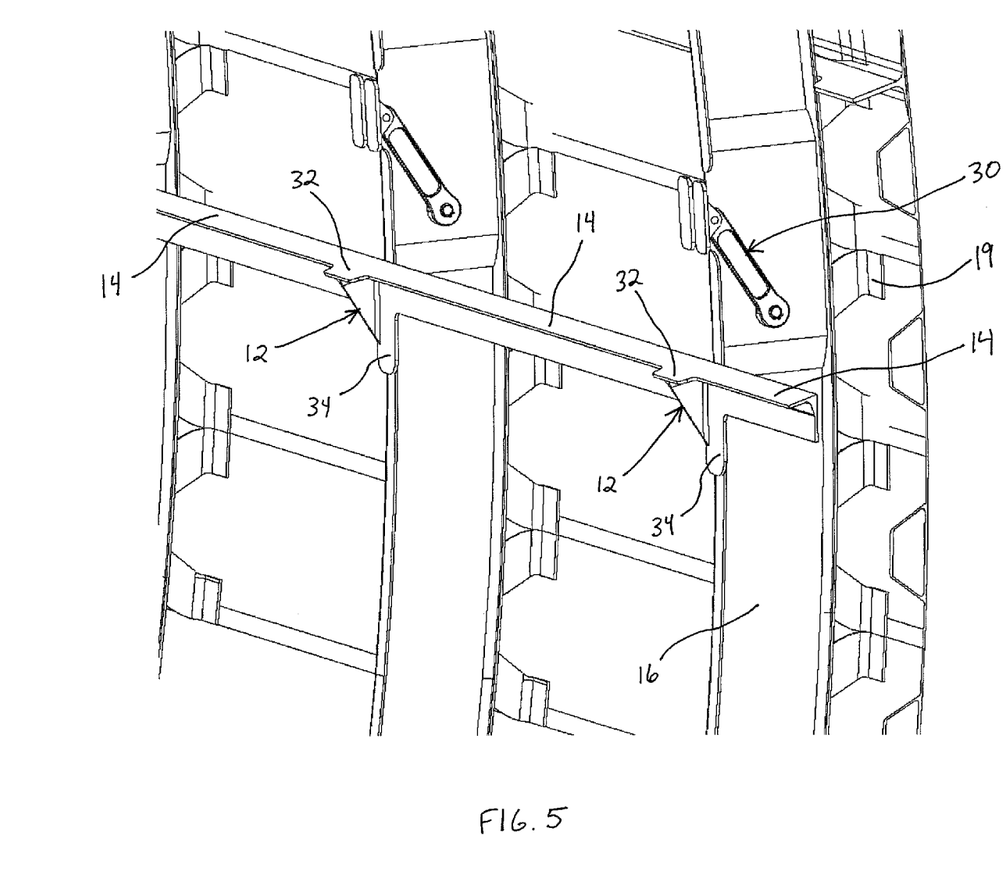

As shown in FIGS. 4 and 5, a plurality of conductive elements 14 are positioned between respective support brackets 12. In particular, the support brackets 12 and conductive elements 14 may be a continuous structure extending along a plurality of hoop frames 16. Thus, the support surface 32 of each support bracket extends between support brackets to define a conductive element 14. Moreover, the most fore or aft conductive elements 14 may extend from only a single support bracket 12, i.e., in a single direction with the foremost conductive element only extending aft from the support bracket 12 and the aft most conductive element only extending forward from the support bracket. The conductive elements 14 shown in FIGS. 4 and 5 are generally L-shaped, where one portion extends from the support surface 32, while the other portion extends from the attachment surface 34. However, the conductive elements 14 could be other cross sections and configurations, as long as the conductive elements facilitate electrical communication with the support brackets 12. For example, only the support surface 32 may extend outwardly to define a conductive element 14. The conductive elements 14 may be integrally formed with the support bracket 12 such as via an extrusion or a molding process or separately attached to one or more support brackets such as via fasteners and the like. The conductive elements 14 are a conductive material, such as metallic materials (e.g., aluminum, copper, and titanium).

Figure 6:
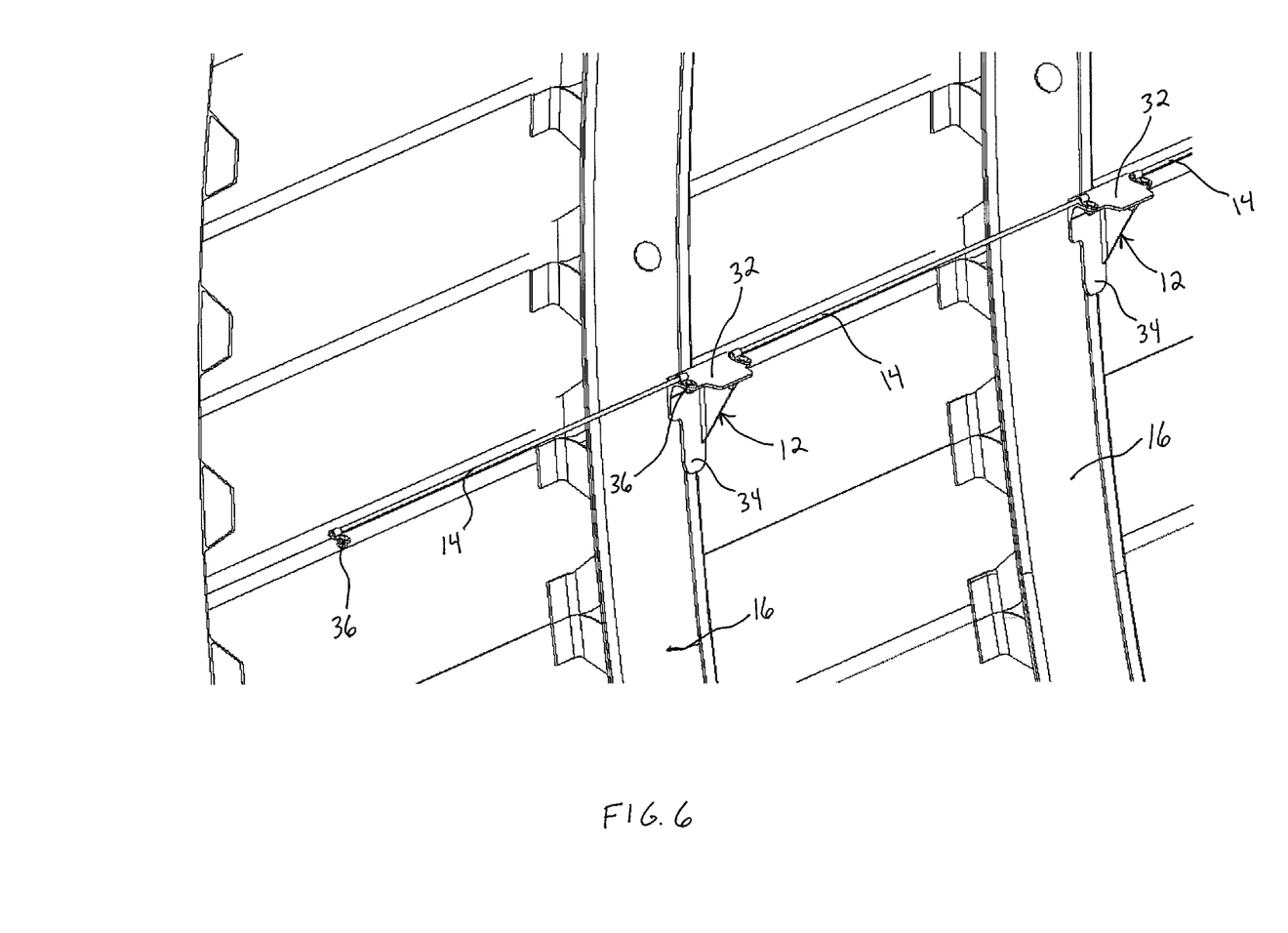
FIG. 6 is an enlarged perspective view of a floor beam assembly according to another embodiment of the present invention.

It is understood that the conductive elements 14 are not limited to a single element integrally formed with the support brackets 12, as shown in FIGS. 4 and 5. Therefore, other configurations of conductive elements 14 could be employed to interconnect one or more support brackets 12. For example, FIG. 6 illustrates an alternative embodiment where the conductive elements 14 are not integrally formed with the support brackets 12. Rather, the support brackets 12 are interconnected via cable buss bars. The cable buss bar may be a single conductive cable that extends in a fore-aft direction between several support brackets 12. For instance, the cable buss bar may extend through an opening defined in each of the support brackets 12. Alternatively, several cable buss bars may be utilized, wherein each cable buss bar extends from one support bracket 12 or between a pair of support brackets. For instance, the ends of each cable buss bar may be attached to each support bracket 12 and/or structure such as with fasteners 36, welding, and the like. Furthermore, the conductive elements 14 could be other structures so long as the conductive elements are capable of electrically communicating with one or more support brackets 12. For instance, the conductive elements 14 could be buss bars or similar conductive bars/rods extending from a support bracket(s) 12 shown in FIG. 3.

One or more of the conductive elements 14 is in electrical communication with one or more support brackets 12 and/or other conductive structure for distributing current through the conductive element(s) and one or more support brackets. Thus, each conductive element 14 is in electrical communication with at least one support bracket 12 in order to provide current return networks and grounding, especially where the floor beams 22 and/or the structure is a composite material or other material having high conductive resistance. For example, the conductive properties of the support brackets 12 and conductive elements 14 carry current loads and returns therethrough by electrically communicating with particular electrical components (e.g., fans, landing or navigation lights, etc.) and/or conductive structures, as well as allow for grounding of various electrical components.

In order to assemble the floor beam assembly 11 within a structure, the support brackets 12 are first attached to respective hoop frames 16. Depending on the particular conductive element 14 used, the conductive elements could be installed in conjunction with the installation of the support brackets 12 if the conductive elements are integrally formed with the support brackets. Or, the conductive elements 14, such as cable buss bars, could be installed after the support brackets 12 have been secured to the hoop frames 16, such as by attaching an end of the cable buss bar to at least one support bracket. The floor beams 22 are positioned adjacent, and in a weight-bearing relationship, to a respective supporting surface 32 of the support bracket 12, as depicted in FIG. 3. Thereafter, further techniques could be employed to secure the floor beams 22 to the structure, such as via pivot arms 30.

Thus, embodiments of the present invention may provide several advantages. For example, the support brackets 12 and conductive elements 14 provide a low resistance electrical current return and grounding network for composite floor beams and/or structures that would not otherwise be capable of doing so. In addition, the floor beam assembly may be readily positioned and secured to the aircraft structure. Thus, embodiments of the present invention eliminate the need for mate-drilled holes and reduce the probability of introducing foreign object debris in the form of fasteners or other debris resulting from removal of material to accommodate the fasteners. In addition, the support brackets 12 may be configured to accommodate fore/aft misalignment of the floor beams 22.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A floor beam system comprising:
    an aircraft structure comprising at least one support member;
    at least one floor beam comprising a pair of free ends;
    at least one support bracket attached to the at least one support member of the aircraft structure and comprising a shelf plate portion and an attachment plate portion extending generally perpendicular from the shelf plate portion, the shelf plate portion having first and second ends and a support surface extending between the first and second ends, the second end of the shelf plate portion directly abutting the at least one support member of the aircraft structure, the support surface extending substantially horizontally and is configured to support one of the free ends of the at least one floor beam directly thereon, the attachment plate portion extends downwardly from the second end of the shelf plate portion and comprises of a rear attachment surface that directly contacts a surface of the at least one support member of the aircraft structure, the at least one support bracket further comprising a support rib extending between and generally perpendicular to the shelf plate portion and the attachment plate portion;
    at least one conductive element comprising of first and second plate portions integrally formed with the at least one support bracket from a single piece of material, the first plate portion of the at least one conductive element extending from and coplanar with the support surface of the at least one support bracket and the second plate portion of the at least one conductive element extending from and coplanar with the attachment plate portion of the at least one support bracket, the at least one conductive element configured for electrically communicating with the at least one support bracket, wherein the at least one conductive element has a different shape and profile than the at least one support bracket such that the support surface of the at least one support bracket comprises a larger cross-sectional dimension than the first plate portion of the at least one conductive element when taken transverse to a longitudinal axis of the at least one floor beam, and wherein the conductive element includes a longitudinal axis extending generally transverse to the longitudinal axis of the at least one floor beam; and
    an electrical component in electrical communication with the at least one support bracket and the at least one conductive element such that the at least one support bracket and the at least one conductive element carry current loads and returns of the electrical component.

2. The system according to claim 1, wherein the at least one support bracket and the at least one conductive element comprise an electrically conductive metallic material.

3. The system according to claim 1, wherein the at least one floor beam is configured to rest on the support surface of the at least one support bracket in a weight-bearing relationship.

4. The system according to claim 1, further comprising a plurality of conductive elements, and wherein a longitudinal axis of each of the conductive elements is coaxial to one another.

5. The system according to claim 1, further comprising a plurality of support brackets spaced apart from one another along the longitudinal axis of the conductive element.

6. The system according to claim 1, wherein the at least one floor beam is supported by the support surface of the at least one support bracket without attachment of the at least one floor beam to the at least one support bracket.

7. The system according to claim 1, wherein the electrical component comprises at least one of a fan or lights.

8. The system according to claim 1, further comprising a pivot arm configured to interconnect the aircraft structure and the at least one floor beam.

9. A floor beam system comprising:
an aircraft structure comprising a plurality of support members;
a plurality of floor beams comprising a pair of free ends and positioned proximate to the support members;
a plurality of support brackets, at least one support bracket attached to each of the plurality of support members and comprising a shelf plate portion and an attachment plate portion extending generally perpendicular from the shelf plate portion, the shelf plate portion having first and second ends and a support surface extending between the first and second ends, the second end of the shelf plate portion directly abutting a respective support member of the aircraft structure, the support surface extending substantially horizontally and is configured to support one of the free ends of a respective floor beam directly thereon, the attachment plate portion extends downwardly from the second end of the shelf plate portion and comprises of a rear attachment surface that directly contacts a surface of a respective support member of the aircraft structure, the at least one support bracket further comprising a support rib extending between and generally perpendicular to the shelf plate portion and the attachment plate portion, the support surface comprising of first and second sides disposed in a fore-aft direction of the aircraft structure with respect to one another, the first and second sides of the support surface each comprising of an opening;
at least one cable buss bar extending through respective openings of respective support brackets to interconnect the plurality of support brackets and configured for electrically communicating with the plurality of support brackets while allowing the floor beams to rest on the support surfaces of a pair of the support brackets in a weight-bearing relationship, wherein the at least one cable buss bar includes a longitudinal axis extending generally transverse to a longitudinal axis of the floor beams; and
an electrical component in electrical communication with the plurality of support brackets and the at least one cable buss bar such that the plurality of support brackets and the at least one cable buss bar carry current loads and returns of the electrical component.

10. The system according to claim 9, wherein the plurality of support brackets and the at least one cable buss bar comprise an electrically conductive metallic material.

11. The system according to claim 9, further comprising a floor panel positioned adjacent to the plurality of the floor beams.

12. The system according to claim 9, wherein the support members comprise a plurality of hoop frames.

13. The system according to claim 9, wherein a pair of support brackets are attached to each structural member, and wherein each floor beam is supported at opposite free ends by a respective pair of support brackets.

14. The system according to claim 9, wherein at least a portion of the structure and the plurality of floor beams comprise a non-metallic composite material.

15. The system according to claim 9, wherein the at least one conductive element extends between, and is coupled directly to, a pair of the plurality of support brackets.

16. A method for installing a floor beam system comprising at least one floor beam having a pair of free ends within an aircraft structure comprising at least one support member, the method comprising:
providing at least one conductive element extending from a support surface of at least one support bracket, the at least one support bracket comprising a shelf plate portion and an attachment plate portion extending generally perpendicular from the shelf plate portion, the shelf plate portion having first and second ends and the support surface extending between the first and second ends, the second end of the shelf plate portion directly abutting the at least one support member of the aircraft structure, the support surface extending substantially horizontally and is configured to support one of the free ends of the at least one floor beam directly thereon, the attachment plate portion extends downwardly from the second end of the shelf plate portion and comprises of a rear attachment surface that directly contacts a surface of the at least one support member of the aircraft structure, the at least one support bracket further comprising a support rib extending between and generally perpendicular to the shelf plate portion and the attachment plate portion;
wherein the at least one conductive element comprising of first and second plate portions integrally formed with the at least one support bracket from a single piece of material, the first plate portion of the at least one conductive element extending from and coplanar with the support surface of the at least one support bracket and the second plate portion of the at least one conductive element extending from and coplanar with the attachment plate portion of the at least one support bracket, the at least one conductive element configured for electrically communicating with the at least one support bracket, wherein the support surface is also configured for electrically communicating with the at least one support bracket, and wherein the at least one conductive element has a different shape and profile than the at least one support bracket such that the support surface of the at least one support bracket comprises a larger cross-sectional dimension than the first plate portion of the at least one conductive element when taken transverse to a longitudinal axis of the at least one floor beam;
attaching the at least one support bracket to the aircraft structure;

positioning a free end of the at one floor beam directly on the support surface of the at least one support bracket attached to the structure, wherein the conductive element includes a longitudinal axis extending generally transverse to a longitudinal axis of the at least one floor beam; and with the at least one support bracket and the at least one conductive element, carrying current loads and returns of an electrical component that is in electrical communication with the at least one support bracket and the at least one conductive element.

17. The method according to claim 16, wherein positioning comprises resting the at least one floor beam on the support surface of the at least one support bracket in a weight-bearing relationship.

18. The method according to claim 16, wherein the aircraft structure comprising a plurality of support members, and wherein attaching comprises attaching a pair of support brackets to each support member.

19. The method according to claim 18, wherein positioning comprises positioning the at least one floor beam on a respective pair of support brackets.

20. A method for installing a floor beam system comprising a plurality of floor beams comprising a pair of free ends within an aircraft structure comprising a plurality of support members, the method comprising:

attaching a plurality of support brackets to the plurality of support members of the aircraft structure, at least one support bracket comprising a shelf plate portion and an attachment plate portion extending generally perpendicular from the shelf plate portion, the shelf plate portion having first and second ends and a support surface extending between the first and second ends, the second end of the shelf plate portion directly abutting the at least one support member of the aircraft structure, the support surface extending substantially horizontally and is configured to support one of the free ends of a respective floor beam directly thereon, the attachment plate portion extends downwardly from the second end of the shelf plate portion and comprises a rear attachment surface that directly contacts a surface of the at least one support member of the aircraft structure, at least one support bracket further comprising a support rib extending between and generally perpendicular to the shelf plate portion and the attachment plate portion, the support surface comprising of first and second sides disposed in a fore-aft direction of the aircraft structure with respect to one another, the first and second sides of the support surface each comprising of an opening;

extending at least one cable buss bar through respective openings of respective support brackets to interconnect the plurality of support brackets and configured for electrically communicating with the plurality of support brackets while allowing the floor beams to rest on the support surfaces of a pair of the support brackets in a weight-bearing relationship, wherein the at least one cable buss bar includes a longitudinal axis extending generally transverse to a longitudinal axis of the floor beams, and wherein the at least one cable buss bar has a different shape and profile than the plurality of support brackets;

positioning a free end of at least one floor beam directly on the support surface of the at least one support bracket attached to the aircraft structure; and with the plurality of support brackets and the at least one cable buss bar, carrying current loads and returns of an electrical component that is in electrical communication with the plurality of support brackets and the at least one cable buss bar.

21. The method according to claim 20, wherein positioning comprises positioning the at least one floor beam on a respective pair of support brackets.

* * * * *

UNITED STATES PATENT AND TRADEMARK OFFICE
CERTIFICATE OF CORRECTION

PATENT NO. : 9,611,029 B2  
APPLICATION NO. : 11/548526  
DATED : April 4, 2017  
INVENTOR(S) : Wood et al.

Page 1 of 1

It is certified that error appears in the above-identified patent and that said Letters Patent is hereby corrected as shown below:

In the Claims

Column 9,
Line 1, "the at one floor beam" should read --the at least one floor beam--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*